Patented Oct. 1, 1935

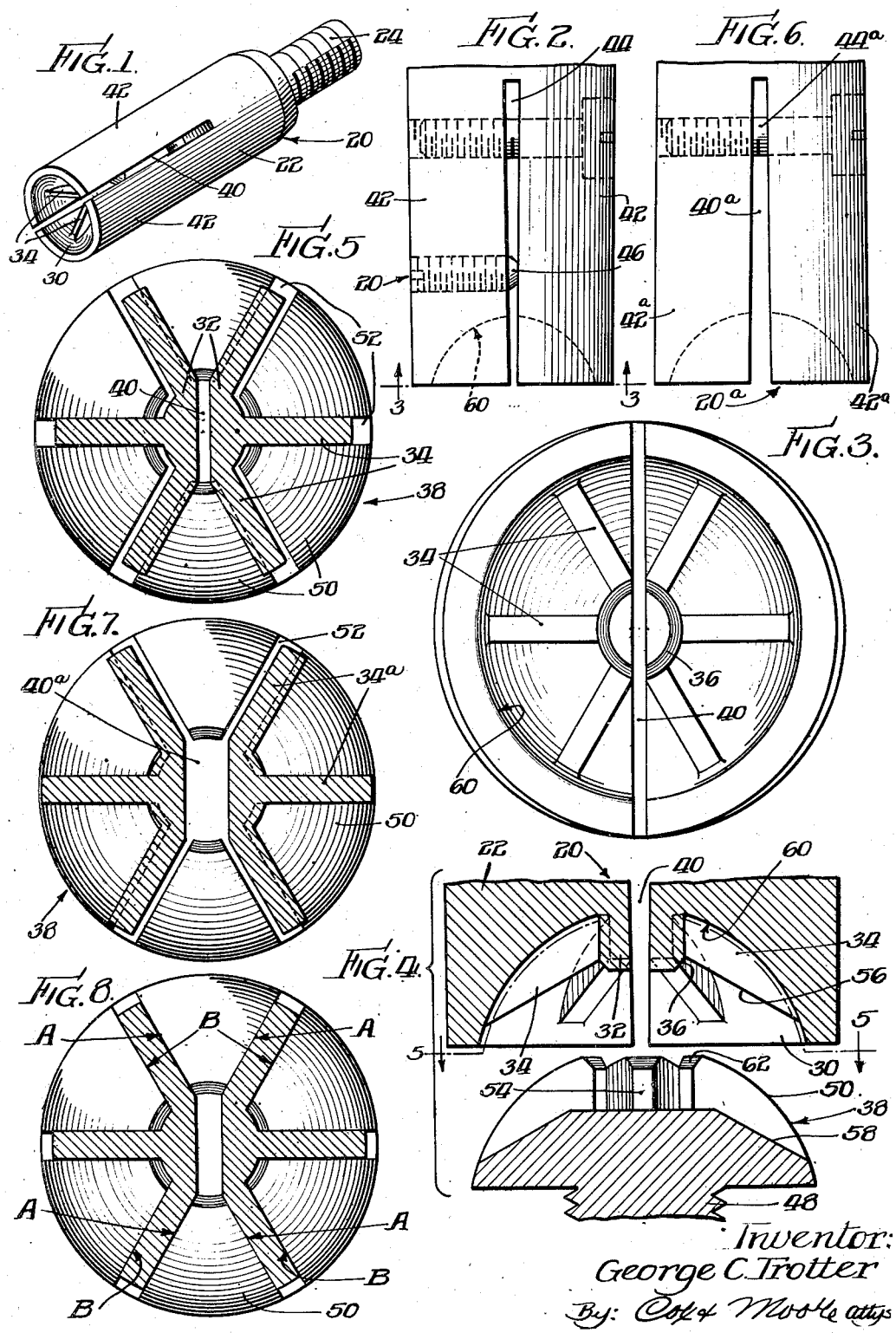

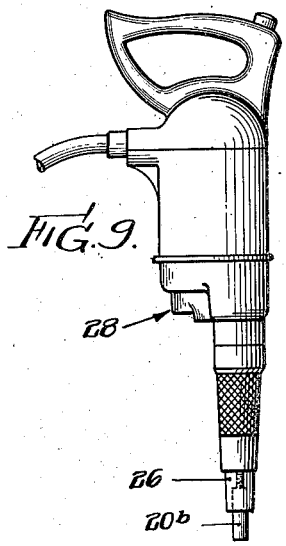
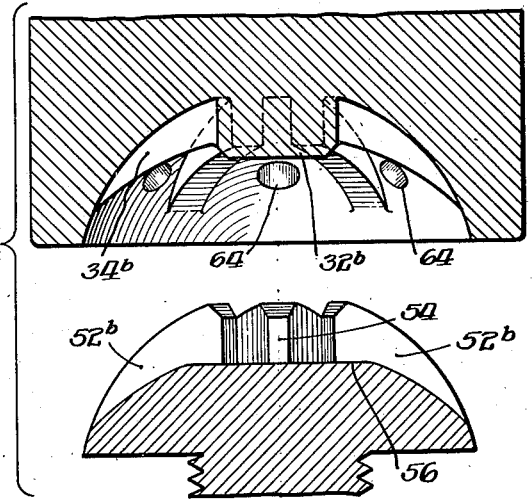
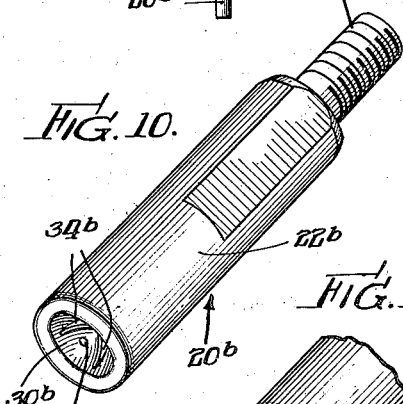
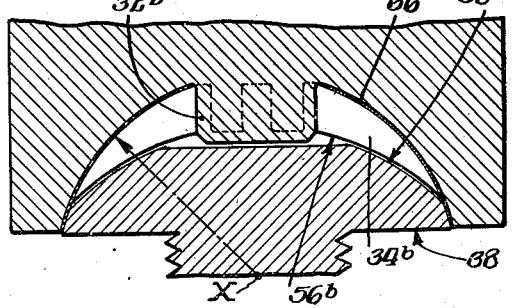
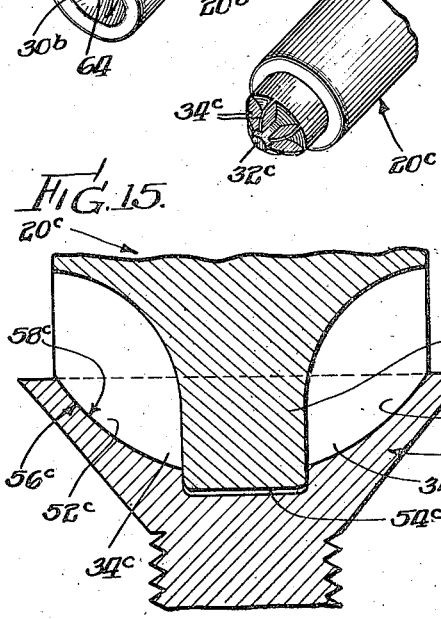
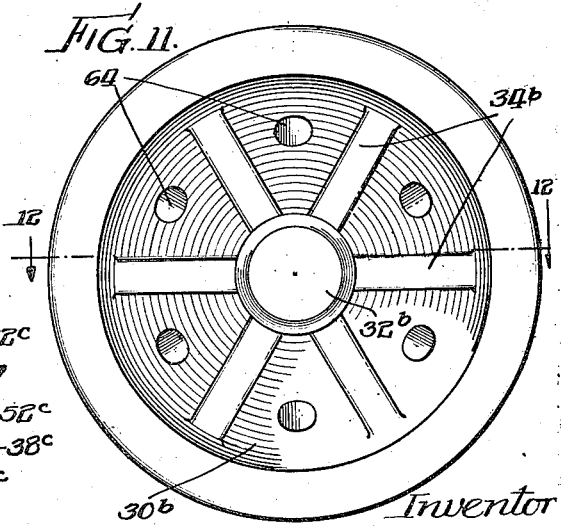

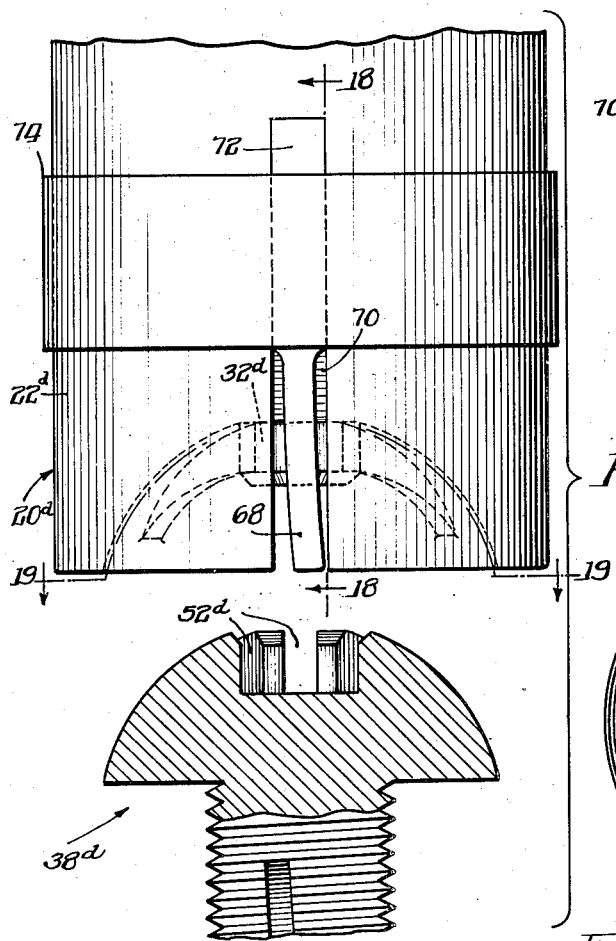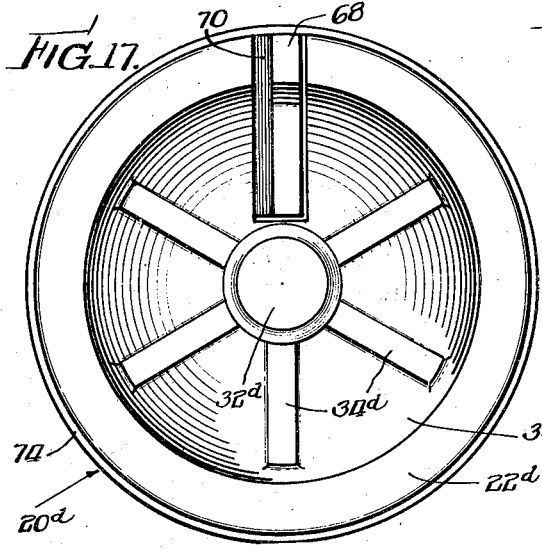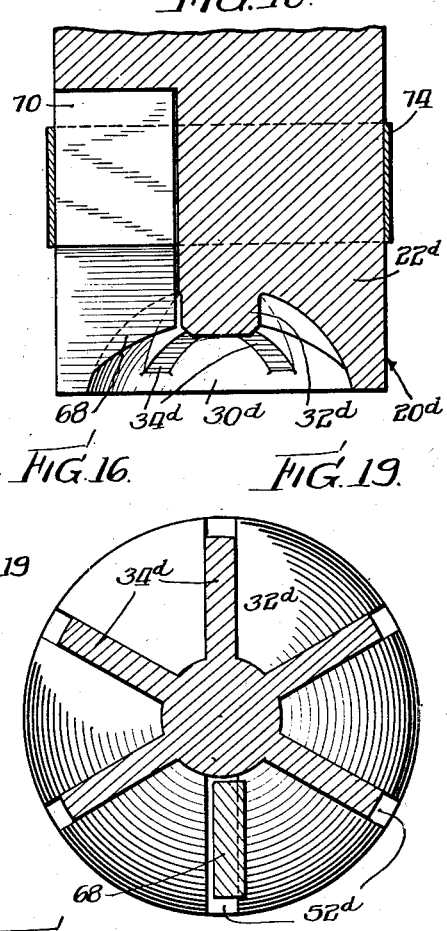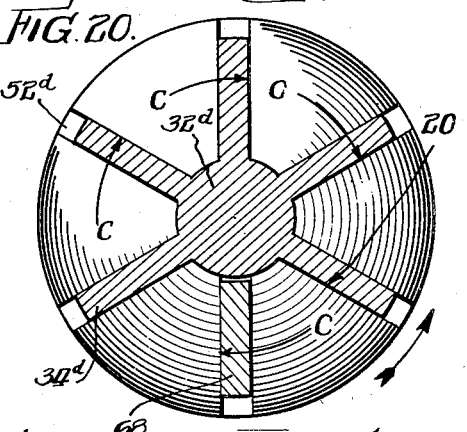

2,015,878

UNITED STATES PATENT OFFICE 2,015,878

COUPLING AND DRIVING DEVICE

George C. Trotter, Chicago, Ill., assignor to Illinois Tool Works, Chicago, Ill., a corporation of Illinois Application December 12, 1932, Serial No. 646,791

9 Claims. (Cl. 145—50)

My invention relates generally to coupling and driving devices and particularly to improved means for coupling a rotary driving mechanism with the head of a screw.

Present day production methods, particularly as applied to the assembly of parts by means of fastening devices, such as screws, require a minimum of time and effort for each assembly job in order to place the work on a profitable basis. I am particularly familiar with some of the problems confronting users of screws commonly referred to as self-tapping screws or tapping screw fasteners, namely, hardened screws which are adapted to form or cut their own thread within a work piece. Such screws are commonly employed to secure sheet metal parts together, and are also used on other materials, such as Bakelite, fibre, and the like. In the automotive, radio, refrigerator and many other industries, line production methods are employed, and therefore tapping screws must be applied with considerable speed.

It has been the practice in many instances to employ power driven screw drivers of the conventional single blade type, together with the conventional slotted screw heads. This method of coupling a turning tool with a screw head presents many disadvantages and inconveniences. In the first place, there is always the inherent danger of the screw driver blade slipping out of the slot in the screw head, thereby marring the work piece and screw head and in many instances damaging the entering edge of the screw driver blades. Frequent replacement of the conventional screw driver blades is a common experience, and it will be apparent that the use of that type of blade requires the utmost caution and skill on the part of an operator to maintain the alinement of the screw and screw driver, particularly during the initial insertion of the screw within the work piece. The use of conventional screw drivers also necessitates considerable manual manipulation of the screw itself during its initial application for the reason that, when the blade is operatively associated with the screw head, there is nothing to hold those parts together other than the user's fingers gripping the body of the screw. Thus, when initially applying a conventionally slotted screw through the agency of a conventional single blade screw driver, there is always the inherent danger of tilting or canting the screw. It will be remembered that a self-tapping screw must form its own thread in the work, as distinguished from the screw applied to a previously threaded aperture, and hence requires more skill and effort by the operator in initially driving the screw into place.

With the foregoing and other problems in mind, my present invention has been developed, and it is one of the primary objects to overcome those disadvantages and difficulties by providing a simple, inexpensive, practical coupling or driving device which is particularly adaptable for use with screws.

More specifically, my invention contemplates the provision of a device, as set forth above, in which a driving member is so arranged as to enable a screw received thereby to automatically aline itself and to maintain this alinement as long as the two parts remain in coupled relation.

Another object of my present invention is to provide in a device of the type set forth a driving element designed to not only maintain alinement between itself and the screw, but to grip the head of the screw sufficiently to enable said screw to be moved into insertable position with respect to an aperture without the necessity of the guiding influence of the operator's fingers, and in this manner I propose to materially reduce the hazards of bodily injury which heretofore have been a potential factor.

Still another object of my present invention is to provide in a driving element, as set forth above, a plurality of ribs or sections adapted to be received by corresponding slots or grooves in the driven part or screw, whereby to enable minimum relative rotation between the parts before registration of the ribs and slots occur.

The foregoing and numerous other objects and advantages will be more apparent from the following detailed description when considered in connection with the accompanying drawings, wherein—

Figure 1 is a perspective view of a coupling and driving device embodying features of my invention, said device being bifurcated so as to automatically spring outwardly when applied to a companion coupling element, such as a round-headed screw, to thereby grip the screw;

Figure 2 is an enlarged fragmentary side elevational view of the coupling extremity of the driving element shown in Figure 1;

Figure 3 is a view of the bottom of the driving element taken substantially along the line 3—3 of Figure 2;

Figure 4 is a central transverse sectional view of the lower extremity of the element in Figure 2 positioned immediately above a screw head designed to receive said driving element;

Figure 5 is a sectional view taken substantially along the line 5—5 of Figure 4 to disclose the relative positions occupied by the ribs or coupling sections of the driving element with respect to the companion slots in the screw head, prior to the operative engagement or coupling of said parts;

Figure 6 is a view similar to Figure 2, disclosing a modified driving element having bifurcated sections adapted to spring inwardly for automatically gripping a slotted coupling element or screw head;

Figure 7 is a view similar to Figure 5, disclosing the relative positions occupied by the ribs or coupling sections of the device in Figure 6 with respect to the screw head just prior to the operative coupling of said parts;

Figure 8 is a view similar to Figures 5 and 7, disclosing the manner in which the ribs of the driving elements of Figures 2 and 6 automatically spring into the slots of the screw head, and thereby frictionally engage the walls thereof so as to temporarily secure the screw head within the driving element;

Figure 9 is an elevational view of a conventional power driven screw driver mechanism equipped with a driving element of the type shown in the above mentioned figures;

Figure 10 is a perspective view of a coupling or driving element which is not provided with bifurcated sections and which depends upon the use of an adhesive material provided on the walls thereof to temporarily secure a screw head carried thereby against longitudinal displacement.

Figure 11 is an enlarged end view of the coupling or driving element taken from the left of Figure 10;

Figure 12 is a transverse sectional view of the driving element taken substantially along the line 12—12 of Figure 11, a fragmentary portion of a screw, the head of which forms a counterpart for the driving element being shown immediately beneath in position to receive said driving element;

Figure 13 is a transverse sectional view similar to Figure 12, disclosing the driving element and screw head in operative association with each other, and also disclosing means in the form of a layer of adhesive material, such as wax, interposed between the screw head and the driving element to provide means for temporarily preventing longitudinal disassociation of the parts;

Figure 14 is a fragmentary perspective view, similar to Figure 10, of a modified driving element which is particularly adaptable for use with coupling members, such as screw heads, differing from the conventional roundhead type;

Figure 15 discloses the driving element of Figure 14 in operative association with a screw of the flathead type;

Figure 16 is a side elevational view of a modified driving device wherein only one of the driving elements or ribs is yieldable for the purpose of frictionally engaging and thereby impositively securing the driven part against longitudinal displacement, a screw being disclosed immediately beneath the driving device in readiness to receive same;

Figure 17 is a bottom view of the driving device of Figure 16;

Figure 18 is a transverse sectional view taken substantially along the line 18—18 of Figure 16;

Figure 19 is a transverse sectional view taken substantially along the line 19—19 of Figure 16, disclosing the relative positions of the driving ribs with respect to the companion slots in the screw head prior to the operative coupling of said parts; and Figure 20 discloses the parts of Figure 18 after they have been operatively coupled.

Referring now to the drawings more in detail wherein like numerals have been employed to designate similar parts throughout the various figures, it will be seen that my invention contemplates the provision of a coupling and driving device which includes a coupling or driving element designated generally by the numeral 20, Figures 1 to 5 inclusive. This element includes a body portion 22 formed with a threaded shank 24 at one extremity thereof, which is designed to be received within a chuck or holder 26 of a conventional power driven device designated generally by the numeral 28, Figure 9. The extremity of the body 22 is provided with a semi-spherical recess or opening 30.

Positioned centrally of the opening 30 and extending therein is a pilot section 32, and radiating from this pilot section is a plurality of ribs or driving sections 34. These ribs 34 are symmetrically arranged with respect to the axis of the body 22, as clearly shown in Figure 3. The pilot section 32 is preferably chamfered at 36 to facilitate its association with a coupling element or screw head 38, later to be described. Extending centrally and transversely of the body 22 is a bifurcating slot or recess 40. This slot divides the body 22 into a pair of resilient sections 42.

These sections 42 are displaced inwardly through the agency of a suitable screw 44, Figure 2, thereby causing the ribs or sections 34 to normally occupy the positions shown in Figs. 3, 4 and 5 prior to the application thereof to the screw head 38. I employ an adjustable set screw or stop 46 to limit the inward deflection of the sections 42, as clearly shown in Figure 2. This presetting or springing of the sections 42 enables the ribs 34 to snap into frictional engagement with wall portions of the screw head 38 in a manner now to be described.

For the purpose of illustrating at least one practical application of my improved coupling and driving device, I have shown the driving element 20 in operation association with the screw head 38. This screw head 38 is provided at one extremity of the usual threaded shank or body 48, and is divided into a plurality of sections 50 by means of radial slots or recesses 52 which communicate at their inner extremities with a central recess or opening 54. Assume that the driving element 20 first occupies the position with respect to the screw head 30 shown in Figures 4 and 5. It will be apparent that the central rib of one body section 42 remains in alinement with the companion central rib of the other body section regardless of the lateral displacement to which said body sections have been subjected by the tightening action of the screw 44. Thus, when the screw head and driving element have been rotated until these central oppositely disposed ribs occupy the position shown in Figure 5 and a force is exerted axially of the driving element, the ribs on opposite sides of these central ribs will spring outwardly and finally snap into position within the companion slots or recesses 52. The ribs will then occupy the position shown in Figure 8. In this position frictional clamping action will take place between the walls A of the screw head and the companion or adjacent surfaces of the ribs (see Figure 8). This frictional engagement with the converging walls A in the screw head is sufficient to temporarily secure the screw and driving element against longitudinal displacement.

The practical significance of this automatic gripping or clamping feature of my improved coupling device will be more readily appreciated when it is understood that, in following conventional methods of applying screws in production work, an operator employs the fingers to hold the screw in operative position with respect to a conventional screw driver in order to prevent the two parts from longitudinal separation, or in some instances the operator manually inserts the screw within an aperture of a work piece and then brings the screw driver into operative association with the screw head. In both of these methods the operator must manually manipulate the screw in such a manner as to introduce considerable delay and the potential hazard of bodily injury. By employing my improved device, the operator performs one manual manipulation with respect to the screw, namely, in initially snapping the screw into the mouth or opening 30 of the screw driver element 20. In fact, if the screws occupy a position whereby the heads thereof present themselves in proper position with respect to the mouth of the screw driving element, no manual manipulation or handling of the screw is required. It will also be apparent that the symmetrical arrangement of the ribs 34 and the radial slots 52 enable a turning torque to be transmitted to the screw head without introducing lateral forces which would have a tendency to cause the screw to cant or tilt. By having the screw and screw driver coupled together as a unit in the manner described, the possibility of canting or tilting is completely obviated, and the operator need only observe the position of the axis of the screw driver with respect to the work in order to properly drive home the screw. This should be compared with the practice of driving home conventionally slotted screws with a conventional single-blade screw driver, wherein the possibility of destroying alinement between the axis of the screw and the screw driver is ever present, and the possibility of the screw driver blade slipping out of the slot can only be avoided by the most dexterous and skillful handling of the screw driver by the operator. The external curved or spherical surfaces of the section 50 of the screw head cooperate with the companion surfaces of the screw driving element 20 in facilitating the ultimate registration of the ribs 34 and the slots 52. In the preferred embodiment of my invention the surfaces 56 of the ribs 34 do not engage the bottom surfaces 58 of the slots 52, Figure 4, when the parts are coupled together so as to occupy the position shown in Figure 8. This can best be observed by referring to the modified form shown in Figure 13, later to be described, wherein clearance is provided between the ribs and the bottom of the slots. With this construction, the portions of the inner spherical surface 60 positioned between the ribs 34 bear directly against the outer companion spherical surfaces of the screw head sections 50. Thus, when the parts are operatively coupled together, a very firm unitary construction is presented with an axial force exerting itself at symmetrically disposed locations of the screw head, and a turning force likewise exerting itself at symmetrically disposed locations on said head.

Referring now to Figures 6 and 7, it will be seen that my invention contemplates a modified construction which includes a driving element designated generally by the numeral 20a. This element is divided into resilient sections 42a by means of a slot 40a, and these resilient elements or sections 42a are sprung outwardly from their normal cylindrical positions against a screw 44a. Thus it will be apparent that the only difference structurally between the driving element 20a and the previously described element 20 is that the bifurcated sections of the element 20a are normally sprung outwardly instead of inwardly. When the element 20a is positioned above the screw head 38, it will appear as shown in Figure 7. Continued axial movement of one part toward the other will eventually bring the chamfered surface of the pilot section 32 into operative association with companion chambered surfaces 62 of the screw head. These surfaces cooperate to guide the pilot section 32 into the aperture 54, and thus spring the bifurcated sections 42a inwardly until the ribs 34a thereof snap into place within the companion radial grooves 52 of the head. Under these circumstances, wall surfaces designated by the letter B, Figure 8, are clampingly or frictionally engaged by adjacent companion surfaces of the screw driver ribs. The screw is thus maintained in alinement with respect to the driving element 20a and is temporarily secured against longitudinal displacement so as to enable the screw to be conveniently and quickly applied to the aperture of a work piece.

In Figures 10 to 13 inclusive I have shown still another modified driving element which I have designated generally by the numeral 20b. This element is provided with a mouth or opening 30b and ribs 34b which correspond structurally with the ribs of the driving elements previously described. It will be seen that the driving element 20b includes a solid body 22b as distinguished from the previously described bifurcated bodies. The body 22b is provided with a threaded shank 24b to permit its operative association with the chuck 26 shown in Figure 9. I provide a plurality of pockets 64 which open into the mouth 30b. These pockets are filled with a supply of adhesive material, such as wax. In Figures 10, 11, and 12 the wax has been omitted in order to more clearly illustrate the structural arrangement of the driving element, but in Figure 13 I have indicated the wax by the numeral 66. It will be seen that this wax is distributed over the inner spherical area adjacent the pockets 64, and when the driving element is brought into coupling relation with respect to the screw head 38, this wax provides means for temporarily securing the parts against axial displacement in the same manner that the frictional engagement of the walls and the slots in the screw head, previously described, serve to prevent relative axial displacement. The only difference structurally between the ribs 34b and the ribs previously described is that the ribs 34b are provided with arcuate surfaces 56b, as compared with the straight surfaces 56 shown in Figure 4. Likewise, the only difference in the structural arrangement of the screw head 38 shown in Figures 12 and 13 is that the bottom 58b of the slots 52b is curved as distinguished from the straight surface 58 of Figure 4. The clearance between the surfaces 56b and 58b, as well as the clearance between the pilot section 32b and the bottom of the central opening 54, is clearly shown in Figure 13. Therefore, it will be apparent that the axial force of all the driving elements thus far described is exerted against the outer spherical surface area of the screw head, and not against the bottom of the slots or recesses in the screw head.

In Figures 14 and 15 I have shown a still further modified driving element which I have designated generally by the numeral 20c. This driving element 20c partakes of a male construction as distinguished from the female construction embodied in the previously described driving elements. The element 20c is formed with a central pilot section 32c, and radiating from said pilot section is a plurality of ribs 34c. This driving element 20c is particularly adapted for use with a flat type or flat top screw head 38c. This head 38c is provided with a plurality of radial slots 52c, each slot being companion to one of the ribs 34c. The central portion of the head 38c is also provided with a recess 54c for receiving the pilot section 32c, Figure 15. Surfaces 56c of the ribs 34c are adapted to directly bear against companion surfaces 58c at the bottom of the slot 52c as distinguished from the previously described devices wherein all of the axial bearing force is exerted against the outer surface of the screw head and not against the surfaces at the bottom of the slots.

Referring now to Figures 16 to 20 inclusive, it will be seen that my invention contemplates a still further modified driving device which I have designated generally by the numeral 20d. This device includes a body 22d having a spherical opening or mouth 30d at one end thereof. Ribs or driving elements 34d formed within the driving device are structurally and functionally similar to the ribs in the driving devices previously described. These ribs 34d radiate from and are formed integral with a central pilot section 32d. Attention is directed to a resilient driving element 68 which is positioned within a longitudinal groove or slot 70 provided in the body 22d. The resilient driving element 68 is formed integral with a shank 72, which is tightly fitted within the slot 70, as clearly shown in Figure 16. The free extremity of the element 68 conforms to the shape of the ribs 32d, as clearly shown in Figure 18. A band 74 or other suitable means is provided for securing the shank 72 against lateral displacement. It will be noted that the free extremity of the resilient driving member 68 is normally displaced out of radial alinement with respect to the oppositely disposed rib 34d. As the driving device 20d is brought into operative relation with respect to the screw head 38d, the element 68 snaps into its companion radial groove 52d, thereby causing all of the backlash between the ribs 34d and slots 52d to be taken up. The action of the finger 68 may be more readily understood by referring to Figures 19 and 20. In Figure 19 I have shown the normally displaced position of the member 68 with respect to a companion radial slot in the head. As the driving device 20d is moved into operative association with the head, the resilient action of the element 68 causes the head to be urged in the direction indicated by the arrow in Figure 20, thereby causing the surfaces C to bear against the adjacent companion surfaces or walls of the ribs 34d. In this manner the screw is impositively held within the driving device against longitudinal displacement to facilitate the initial application of the screw to the work.

The gripping or clutching arrangement disclosed in Figures 16 to 20 inclusive presents an advantage over the structures previously described in connection with Figures 1 to 8 inclusive, in that the clamping force, as indicated in Figure 20, acts simultaneously upon all of the ribs, as distinguished from the other devices wherein at least one pair of oppositely disposed ribs exert no clamping force. The clamping force exerted by the device in Figures 16 to 20 inclusive acts in a circumferential direction, as distinguished from the other devices wherein the force acts transversely or laterally of the screw axis. Furthermore, by employing the device shown in Figures 16 to 20 inclusive, all of the backlash between the ribs and the bearing surfaces in the screw head is removed before the tightening action of the driving device begins. In this manner I preclude any hammering action against the walls in the screw head when the initial force of the driving device is applied.

From the foregoing it will be apparent that my invention provides a very simple and practical device for quickly and effectively coupling elements together. It will be further apparent that the invention has a very practical application in coupling a driving element, such as a screw driver, with the head of a screw. My improved coupling device has proven very effective in applying screws of the self-tapping type, that is, screws which are designed to form or cut their own thread within the unthreaded walls of an aperture in a work piece. When screws of the self-tapping type are employed, it is of the utmost importance that they be initially inserted without being subjected to tilting or canting. In view of the fact that the screw itself must start the thread and is not guided by a previously formed thread, it is of the utmost importance that the initial thread be formed properly so as to pull the screw at right angles with respect to the surface of the work piece.

In the specification and some of the claims I have defined the driving device as being equipped with means for "impositively" securing the parts against longitudinal displacement. In using the term "impositively", I mean to say that the screw is held within the driving device with sufficient force to prevent inadvertent longitudinal separation, but that this holding effectiveness is sufficiently impositive to permit the separation of the parts after the screw has been tightened within the work piece. In all of the various modifications disclosed herein, the elements coupled together, such as the screw and driving device, are positively secured against misalinement, thereby causing said parts to operate as a unit, for example, when the screw is applied to the work piece. This unitary feature, as well as the self-alining feature, contributes materially to the success which the invention has actually experienced in the field. It will be seen that in the screw driving devices defined to drive roundhead screws, the inner spherical surface has its center at the point designated by the letter X in Figure 13. When the screw driving device and roundhead of the screw are operatively coupled, the letter X also designates the center of the spherical surface of the screw head.

While I have described my invention as applied specifically to screws and driving devices therefor, it will be apparent that said invention is not limited to that particular field, but is broadly adaptable as a coupling and driving device for other purposes.

Having thus described my invention, what I claim as new and desire to secure by Letters Patent is:

1. A coupling and driving structure including a rotatable driving device having a plurality of coupling elements at one end thereof adapted to interlock with companion elements on a rotatable device to be driven thereby, said driving device being equipped with a driving member which is automatically and laterally shiftable when said devices move axially into association with each other for impositively securing the parts against longitudinal separation.

2. A coupling and driving structure including a rotatable driving device having a plurality of coupling elements at one end thereof adapted to interlock with companion elements on a rotatable device to be driven thereby, said driving device being equipped with a resilient member which is automatically shiftable when said devices move axially into association with each other for impositively securing the parts against longitudinal separation.

3. A coupling and driving structure including a rotatable driving device having a plurality of radial coupling elements at one end thereof adapted to interlock with companion elements on a rotatable device to be driven thereby, at least one of the radial elements of said driving device being automatically and laterally shiftable when said devices move axially into association with each other for impositively securing the parts against longitudinal separation.

4. A coupling and driving structure including a rotatable driving device having a plurality of coupling elements at one end thereof, a driven device adapted to interlock with the elements on said driving device and thereby couple one part with the other, and means including a laterally shiftable driving element operable when the parts are axially moved into association with each other for establishing sufficient frictional resistance between said parts to impositively secure them against longitudinal separation.

5. A coupling and driving structure including a rotatable driving device having a plurality of radially disposed driving members, and a driven device having a plurality of radial recesses forming counterparts of the radial elements, whereby to establish a driving connection when the devices are moved axially into association with each other, at least one of the elements in the driving device being yieldable and normally displaced out of registration with a companion recess in the driven device whereby, when the devices are coupled together, sufficient frictional resistance is established by the displaced element to prevent inadvertent longitudinal separation of the parts, said radial recesses and elements being disposed in a manner to secure said devices against misalignment in any direction.

6. A coupling and driving structure including a rotatable driving device having a shank provided with an opening at one end thereof, and a plurality of radially disposed ribs projecting from the wall of said opening, said ribs being adapted to interlock with companion recesses in a part to be driven thereby, said driving device being equipped with a driving element for establishing frictional resistance automatically in response to the movement of said device axially into association with another device to be driven, whereby to prevent inadvertent longitudinal separation of said devices after they have been coupled together.

7. A coupling and driving structure including a rotatable driving device having a shank provided with an opening at one end thereof, a plurality of oppositely disposed radial ribs projecting from the wall of said opening, said ribs being adapted to interlock with companion recesses in a part to be driven thereby in a manner to impositively secure said interlocked parts against longitudinal separation, and a pilot section positioned centrally of said ribs.

8. A coupling and driving structure including a rotatable driving device having a plurality of coupling elements at one end thereof adapted to interlock with companion elements upon a rotatable device to be driven thereby, said driving device having a yieldable section to enable said device to impositively grip the device to be driven, said elements having in operative association therewith a guiding section adapted to cooperate with the device to be driven in a manner to effect the automatic interlocking of said devices in response to movement of said devices axially into association with each other.

9. A coupling and driving structure including a rotatable driving device having a plurality of coupling elements arranged in a spider-like manner, said elements being adapted to interlock with companion similarly disposed elements on a rotatable device to be driven, said driving device being equipped with means whereby said spider-like elements are adapted to impositively grip the elements of the device to be driven and cooperating to secure said coupled devices against misalignment in a plurality of oppositely disposed directions, and a pilot section adapted to facilitate the application of the driving device to the device to be driven, a portion at least of said pilot section being yieldable toward the other portion thereof.

GEORGE C. TROTTER.